(12) United States Patent
Rao et al.

(10) Patent No.: US 7,933,620 B2
(45) Date of Patent: Apr. 26, 2011

(54) TRANSMIT CHANNEL REQUEST MESSAGING FOR HALF-DUPLEX VOICE COMMUNICATIONS SYSTEMS

(75) Inventors: Padakandla Krishna Rao, Kanata (CA); Sing Janus Yau, Ottawa (CA)

(73) Assignee: Research In Motion Limited, Waterloo, Ontario (CA)

( * ) Notice: Subject to any disclaimer, the term of this patent is extended or adjusted under 35 U.S.C. 154(b) by 861 days.

(21) Appl. No.: 10/787,300

(22) Filed: Feb. 27, 2004

(65) Prior Publication Data
US 2005/0190723 A1    Sep. 1, 2005

(51) Int. Cl.
*H04B 7/00* (2006.01)

(52) U.S. Cl. ..... 455/518; 455/515; 455/464; 455/452.2; 455/450; 455/509; 455/511; 455/512; 455/519; 370/329

(58) Field of Classification Search ............ 455/515, 455/464, 452.2, 450, 509, 511, 512, 518, 455/519; 370/329
See application file for complete search history.

(56) References Cited

U.S. PATENT DOCUMENTS

| | | | |
|---|---|---|---|
| 6,370,123 B1 | 4/2002 | Woo | |
| 6,671,511 B1 * | 12/2003 | Forssell et al. | 455/452.1 |
| 6,721,573 B2 * | 4/2004 | Silvestri | 455/463 |
| 6,751,468 B1 * | 6/2004 | Heubel et al. | 455/518 |
| 6,930,994 B1 * | 8/2005 | Stubbs | 370/348 |
| 7,136,663 B2 * | 11/2006 | Metais et al. | 455/509 |
| 2004/0125800 A1 * | 7/2004 | Zellner | 370/389 |
| 2005/0032539 A1 * | 2/2005 | Noel et al. | 455/518 |

FOREIGN PATENT DOCUMENTS

| | | |
|---|---|---|
| CA | 2375428 | 11/2001 |
| CN | 1232358 A | 10/1999 |
| JP | 11-88224 | 3/1999 |
| JP | 11-103264 | 4/1999 |
| WO | 00/35231 | 12/1998 |
| WO | 00/69189 | 4/2000 |
| WO | WO 00/74410 A1 | 5/2000 |
| WO | WO 02/93954 | 5/2002 |
| WO | 03036801 | 5/2003 |

OTHER PUBLICATIONS

Terrestrial Trunked Radio (TETRA); Voice Plus Data (V+D); Designers guide Part 3: Direct Mode Operation (DMO); ETR 300-3, ETSI Standards, European Telecommunications Standards Institute, Sophia-Antipo, FR, vol. TETRA-1, Feb. 2000, XP014011429.

(Continued)

*Primary Examiner* — Patrick N Edouard
*Assistant Examiner* — Shantell Heiber (57) ABSTRACT

A method, system, and device are provided for transmit channel request messaging in wireless half-duplex voice communication systems. A new transmit channel request message (TCRM) is provided and sent over a logical control channel from a receiving device capable of walkie-talkie-like functionality, during an active half-duplex session, to a transmitting device capable of walkie-talkie-like functionality, indicating that the transmit channel is requested. In some embodiments, the invention provides for the display of information on the transmitting device user interface (UI) indicating, during an active session, that another user wishes to talk. The TCRM includes an indication that another device has requested the transmit channel and preferably includes an identification of the device which sent the transmit channel request message. In some embodiments, a qualifier flag in the TCRM is used to specify what, if any, extended functionality in respect of the TCRM is to be performed.

17 Claims, 3 Drawing Sheets

OTHER PUBLICATIONS

OMA Input Contribution document, (referring to PoC documents) Doc. #OMA-POC-2003-0007Ri—Contributed Specification Suite.
iDEN™ Technical Overview document, 68P81095E55-E (Software Release 9.1.
Push-to-Talk over Cellular (PoC) User Plane; Transport Protocols; PoC Release 1.0, Transport Protocols V1.1.1 (Oct. 2003).
Push to Talk over Cellular (PoC); List Management and Do-not-Disturb; PoC Release 1.0; List Management and Do-not-Disturb V1.1.4 (Oct. 2003).
Push-to-Talk over Cellular (PoC) User Plane; (E)GPRS/UMTS Specification; PoC Release 1.0; (E)GPRS/UMTS Specification V1.1.1 (Oct. 2003).
Push-to-Talk over Cellular (PoC); Signalling Flows; PoC Release 1.0; Signalling Flows V1.1.4 (Oct. 2003).
Push-to-talk over Cellular (PoC); Architecture; PoC Release 1.0, Architecture V.1.1.1 (Oct. 2003).
Push-to-Talk over Cellular (PoC); User Requirements; PoC Release 1.0; User Requirements V1.1.1 (Oct. 2003).
English-language translation of Office Action, Japanese Application No. 2006-524195, Apr. 2, 2009.
English-language translation of Office Action, Chinese Application No. 04251151.9, Feb. 6, 2009.
English-language translation of an Office Action dated Jul. 17, 2009 from corresponding Chinese Patent Application No. 200580001122. 1, 13 pages.

* cited by examiner

TRANSMIT CHANNEL REQUEST MESSAGING FOR HALF-DUPLEX VOICE COMMUNICATIONS SYSTEMS

FIELD OF THE INVENTION

The invention relates to wireless communications systems and more particularly to messaging in wireless communications systems having half-duplex voice communications services.

BACKGROUND OF THE INVENTION

Communication systems are available which provide walkie-talkie-like functionality or similar half-duplex voice functionality which may take the form of PTT™ (Push-to-Talk™) over a dispatch service, PTT™ over cellular (PoC) services (part of the OMA standard), or otherwise. When referred to herein, walkie-talkie-like functionality and half-duplex voice functionality are to be taken generally to mean any network delivered voice communication functionality which at any one time is capable of transmitting voice communication from a talking or transmitting party's device to a listening or receiving party's device, but cannot simultaneously transmit voice communication from the receiving party's device to the talking party's device, while the talking party's device is transmitting voice to the receiving party's device. During an active PTT™ session or dispatch call session, only one user device (the "talker's" device) participating in the session may be designated as the transmitting or talking device at any one time. A user device gains the role of transmitting device by requesting the talk/transmit channel from the network and by being granted the talk/transmit channel by the network. While a talker's device is in possession of the transmit channel (during a talk period), all of the other devices (listeners' devices) in the active dispatch call session are in listener mode and cannot transmit voice until the transmitting device requests the network to terminate the talk period and release the talk/transmit channel. Times during which the talk/transmit channel is not occupied are idle periods. In standard implementations of PTT™, the user interface of, for example, a mobile device, includes a PTT™ button to allow the user to control the sending of requests to acquire and release the talk/transmit channel, these requests being sent over a logical control channel to the network.

An example of a system providing PTT™ functionality as part of its dispatch services is the iDEN™ system of Motorola™. Other example systems which can provide such PTT™ services are 1xRTT CDMA, UMTS, GSM/GPRS, and TDMA. Push-to-talk™ service may be provided as an optional half-duplex service over existing network systems which also provide for full-duplex communication, or may be provided as a service over network systems which provide only half-duplex communication.

SUMMARY OF THE INVENTION

The present invention provides for a method, system, and device for transmit channel request messaging in half-duplex voice communication systems. A new transmit channel request message (TCRM) is provided and sent over a logical control channel from a receiving device to a transmitting device while the transmitting device is in possession of a transmit channel in an active half-duplex dispatch call session, the TCRM indicating that the transmit channel is requested. In some embodiments, the invention provides for the conveying of information via the transmitting device user interface (UI) indicating, that while the transmitting device is in possession of the transmit channel, another user wishes to talk. In some embodiments, the information includes an indication that another device has requested the transmit channel and preferably includes an identification of the device which sent the transmit channel request message. In some embodiments, a qualifier flag in the TCRM is used to specify what, if any, extended functionality in respect of the TCRM is to be performed.

According to one broad aspect, the invention provides for a method of messaging during an active half-duplex session between a plurality of user devices capable of walkie-talkie-like functionality, the method comprising: a first user device of said plurality of wireless devices while in a receiving in half-duplex (RHD) mode for an active half-duplex session, transmitting a transmit channel request message (TCRM) to a network; the network forwarding the TCRM to a second user device of said plurality of user devices while the second user device is in a transmitting in half-duplex (THD) mode for the active half-duplex session; and the second user device receiving the TCRM.

According to another broad aspect, the invention provides for a user device capable of walkie-talkie-like functionality adapted to participate in an active half-duplex session, the user device comprising: means for receiving an external input requesting the user device to transmit an outgoing TCRM message; means for transmitting the outgoing TCRM to a wireless network responsive to the request; means for receiving an incoming TCRM message from the wireless network while the user device is in transmit half-duplex mode; and means for generating a user-detectable notification in response to receiving the incoming TCRM message.

According to a further broad aspect, the invention provides for a network adapted to facilitate an active half-duplex session involving an RHD device capable of walkie-talkie-like functionality and a THD device capable of walkie-talkie-like functionality, the network comprising: a message processing element adapted to forward a TCRM from the RHD device to the THD device by: i) receiving the TCRM over an input channel from the RHD device; ii) processing the TCRM to identify from the TCRM the identity of the THD device; and iii) transmitting the TCRM over an output channel to the THD device.

According to yet another broad aspect, the invention provides for a memory for storing data for access by a THD device of a network, comprising: a data structure stored in said memory, said data structure being a TCRM and comprising an identification of an RHD device.

Other aspects and features of the present invention will become apparent to those of ordinary skill in the art upon review of the following description of specific embodiments of the invention in conjunction with the accompanying figures.

BRIEF DESCRIPTION OF THE DRAWINGS

Preferred embodiments of the invention will now be described with reference to the accompanying diagrams, in which.

DETAILED DESCRIPTION OF THE PREFERRED EMBODIMENTS

Users on the receiving end of a Push-to-Talk™ session held on known systems have no way of communicating to the user of the transmitting device, since the talk/transmit channel is occupied by the transmitting device until released. As such, prior to the present invention there was no mechanism to inform the user of the transmitting device that another user wishes to talk.

Figure 1:
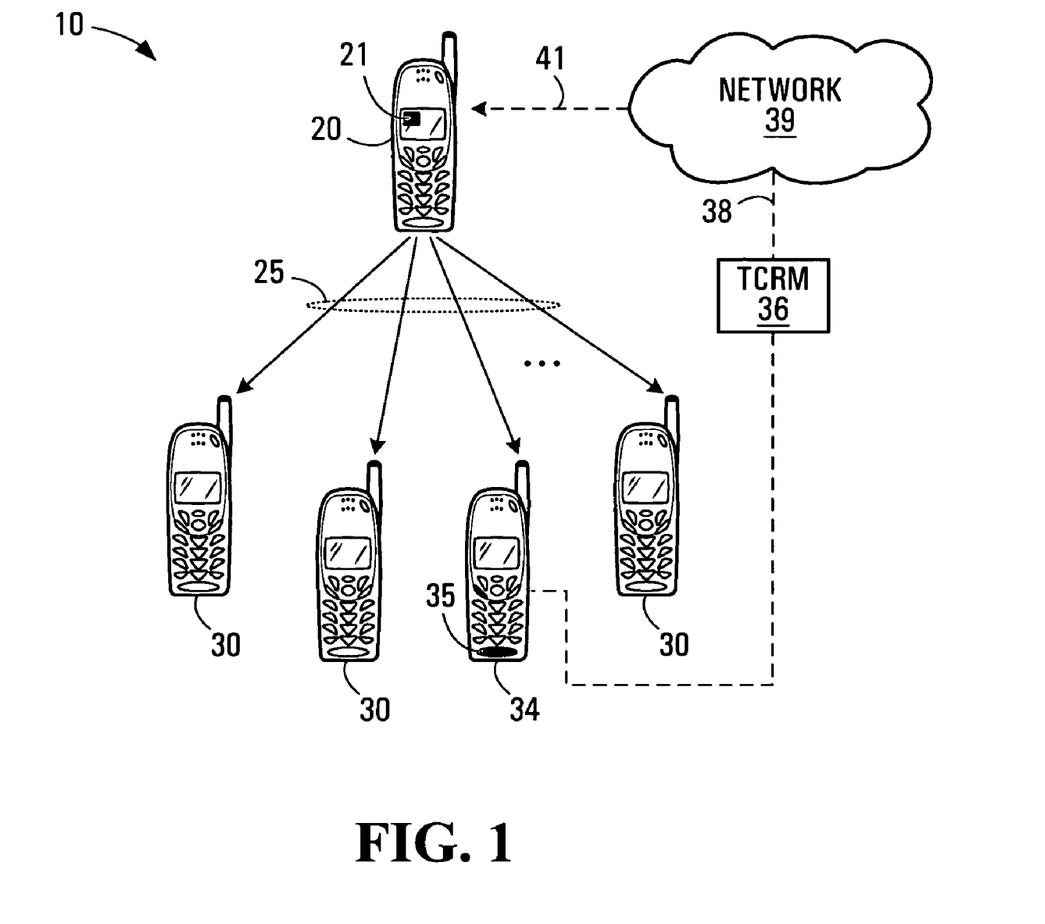
FIG. 1 is a block diagram illustrating example transmit channel request messaging in an active PTT™ session of a group according to an embodiment of the invention.

Referring now to FIG. 1, transmit channel request messaging according to the invention will now be described in the context of an active dispatch call session for a PTT™ group of wireless mobile devices in a half-duplex dispatch system. More generally, embodiments of the invention are applicable in the context of wireless devices and networks which participate in network delivered walkie-talkie-like functionality, PTT™ being but one example. A network capable of delivering this will be referred to as a "dispatch network".

Shown is a PTT™ group (indicated generally by reference numeral 10) consisting of a group of mobile devices participating in an active PTT™ session while a transmit channel is possessed. The group contains a single mobile device 20 in THD (transmitting in half-duplex) mode which is in talk/transmit mode and in possession of the transmit channel, and a set (only four shown) of devices 30,34 in RHD (receiving in half-duplex) mode which are in listening mode. It should be understood that transmit channel messaging is equally applicable to embodiments in which the dispatch call session only involves two devices (a 1-to-1 session) or which involves more than two devices (a 1-to-many session). To simplify this description, a device in THD mode or RHD mode will be referred to as a THD device or an RHD device respectively. However it is to be understood these are temporary designations for the particular mode of operation of the device at any particular time. During the active session, the users of the RHD devices (30, 34) are referred to as listeners, while the user of the THD device 20 is referred to as the talker. Each device of the specific embodiment shown in FIG. 1 is capable of functioning either as a THD device or an RHD device, depending upon which device is in talk/transmit mode and which devices are in listening mode during any particular active session.

The establishment of the physical links between devices of the users, the routing of voice data packets, and the duplication of voice data packets to each of the devices in listening mode are specific to each implementation of a PTT™ or similar half-duplex voice communication system. These functions are represented abstractly by links 25 which represent all of the system components necessary to communicate the voice data sent by the THD device 20 to all of the RHD devices 30 and in general support the functions of an active session. The details of these links are not relevant here. During the active session, the THD device 20 possesses the talk/transmit channel until it requests release of the channel or terminates the call.

According to a preferred embodiment, an example of which is depicted in FIG. 1, during an active session a listener's device 34 in listening mode is adapted to send a transmit channel request message (TCRM) 36 over a logical control channel 38 in response to external input from the listener. In the illustrated example the external input occurs when button 35 is depressed. The logical control channel 38 may be a control channel, data channel, or dedicated messaging channel depending upon the system in which the messaging is implemented. More generally, any channel that allows the network to receive an indication that the user has requested the transmit channel may be employed. While referred to herein as a "message", this encompasses any signal sent by the wireless device to achieve the desired effect. The TCRM 36 is received by the network 39 and forwarded to the THD device 20. The message is forwarded to the THD device on logical control channel 41 which has the same options for implementation as the logical control channel 38. It is noted that the network 39 represents all system components necessary to receive a TCRM message from an RHD device and forward this on to the THD device 20. This functionality may overlap partially, completely, or not at all with the functionality generally represented by 25 which provides normal PTT™ voice capabilities.

In an embodiment implemented in the iDEN™ system of Motorola™, a preferred logical control channel is the data link layer sometimes referred to as layer 2 used to send a TCRM 36 in the form of a layer 3 message. The TCRM could be sent over the L2 control channel, could be sent over a dedicated control channel (DCCH), or an associated control channel (ACCH). The TCRM 36 is forwarded by the network to the THD device 20. The dispatch call control functions of the iDEN™ system are controlled by the interaction of a DAP (Dispatch Application Processor) server, with the EBTSs (Enhanced Base Transceiver Stations) and the mobile devices. In an example implementation the combination of EBTSs and any intervening part of the network which forwards the TCRM 36 from the listener's RHD device 34 to the THD device 20 fulfills the role of network 39.

Once the THD device 20 receives the TCRM 36 from the network 39, an indication that another user has requested the transmit channel is generated on a user interface (UI) of the THD device 20. In the illustrated example, this is presented by shading an area 21 on the device 20 in THD mode. In some embodiments this takes the form of an alphanumeric indication on an LCD display, but other indications are also contemplated, including but not limited to vibrations originating in the device, audible alarms from a speaker, synthesized speech announcements, a UFMI (Urban Fleet Member Identifier) flashing on a visual display screen or appearing in a pop-up window on the screen. In some embodiments, information identifying the user making the request is included in the TCRM 36. This information could be, for example, a UFMI. This may be added to the TCRM message either by the RHD device itself or by the network. The THD device 20 may display the identity of the user's device which sent the request, which may take the form of the UFMI itself, or an alias stored in the THD device 20 for display in place of the UFMI. The display of this information provides to the talker an opportunity to choose to release the talk/transmit channel or to continue to talk and keep ownership of the talk/transmit channel.

Figure 2:
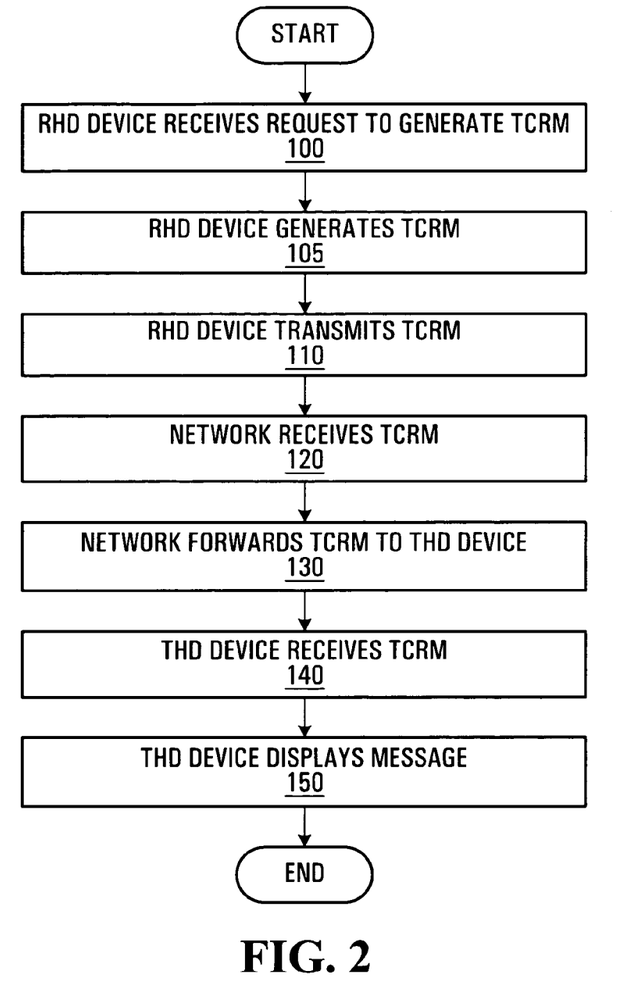
FIG. 2 is a flow diagram depicting steps performed by a system to implement transmit channel request messaging according to another embodiment of the invention.

Referring now to FIG. 2, steps performed by a system to implement transmit channel request messaging according to another embodiment of the invention will now be discussed.

At step 100, during an active session, an RHD device, for example RHD device 34 of FIG. 1, of a listener locally receives a request to generate a TCRM. This could be an input initiated by the listener or initiated by an automated function local to the device. In response to this, at step 105, the RHD device generates a TCRM. In some preferred embodiments, the TCRM is generated if the listener presses, at a time during which the talker is speaking and the transmit channel is occupied, a PTT™ button or a button specifically designated for the TCRM. In a preferred embodiment, the TCRM is not generated at the RHD device unless the talk/transmit channel is occupied at that time, and moreover in another preferred embodiment, once the talk/transmit channel is released, any TCRMs in transit within the network will not be forwarded any farther towards the THD device. Other types of input mechanisms are also contemplated such as, but not limited to, selection from a menu of RHD device functions by keypad or input pen or by voice activation initiated by the listener. The RHD device then transmits the generated TCRM to the network at step 110. At step 120, the network receives the TCRM and forwards it to the appropriate THD device in step 130. The THD device receives the TCRM at step 140. The THD device then executes functionality in response to the receipt of the TCRM at step 150 which in a preferred embodiment includes generating a notification in the THD device which is user-detectable (i.e. by the talker) indicating that another user has requested the talk/transmit channel.

Although the TCRM is typically implemented for the purpose of indicating that the listener wishes to talk, the TCRM may also be used by a listener to simply request that the THD device release the talk/transmit channel. The notification preferably is made on an LCD or other visual display user interface (UI) and preferably includes an identification of the user requesting release of the channel as discussed above. In another example, an audible notification may be generated, for example, synthesized speech announcing to the user that the TCRM has been received, and preferably announcing the identification of the listener making the request. After the indication has been made to the user of the THD device, the system functionality associated with subsequent actions of the talker to release or keep the channel, and of the listener to commence a new talk period after the talk/transmit channel is free, is the same as that which occurs when talk/transmit channels are released and talk periods are initiated when no TCRM is sent or received.

In some embodiments, after the network receives the TCRM from the RHD device, the network (for example using a call processing server such as the DAP in the iDEN™ system) uses the device identifier in the TCRM to look up the current PTT™ group session in which the RHD device is participating. Alternatively, if the logical control channel used by the wireless device to transmit the TCRM is unique to that wireless device, the network can figure out which device sent the TCRM from the channel on which the TCRM was received. The call processing server then retrieves the group identification from the active group having the group session, and then armed with this information retrieves the device identification of the THD device. The identification of the THD device is then inserted into the header of the TCRM as is normally performed when the DAP forwards a Layer 3 message to a particular device. The TCRM is then properly forwarded to the THD device. The details of talk group list management and control are well documented and will not be elaborated upon here.

In some embodiments, the network performs appropriate filtering to reduce the number of TCRMs reaching the THD device. For example, in one embodiment, when multiple users send TCRMs, the network applies filtering to limit the number of TCRMs forwarded to the THD device or to limit the TCRMs forwarded to be only those TCRMs of specific users. In these embodiments, the network filters and forwards the TCRMs, preferably one at a time and in order. In other embodiments, when multiple users send TCRMs the network forwards all of the TCRM's to the THD device for storage in a queue, identifying the requesting user device or user in the order in which their respective TCRM was received. In these alternative embodiments, when more than one TCRM is received by the THD device, preferably the THD device user interface is arranged to display the user or device identification of each of the users or devices for which a TCRM was received at the THD device.

In some embodiments, receipt by the network of multiple messages from listening devices or the RHD device is dealt with. For example, in one embodiment when multiple TCRMs are sent by a single RHD device, only the first TCRM is forwarded to the THD device for a set flood protection duration during which time no further TCRMs are forwarded to the THD device. In some preferred embodiments, flood protection is performed by the RHD device of the listener, by being unresponsive to additional listener initiated requests to generate a TCRM, until the flood protection period has expired. Such an embodiment reduces the cost of additional traffic on the network which could otherwise result from TCRM flooding. In another embodiment, flood protection is performed by the network, which forwards the first TCRM to the THD device and filters, for example by deletion, any subsequent TCRM from the same RHD device within the flood protection duration thereafter. It should be noted that, in this particular embodiment, within the flood protection duration of one RHD device, another RHD device may independently send a TCRM to the THD device. Once the flood protection duration has expired, the network then is free to forward another single TCRM received from the RHD device. These particular embodiments advantageously protect the network from unwanted flooding by the excessive transmission of TCRM messages.

In an alternative embodiment, the TCRM is used to communicate a continual request status of the listener's wanting the talk/transmit channel, which is active while the listener wishes to talk and inactive when the listener does not wish to talk. In such a preferred alternative embodiment the listener activates the request status by pressing and holding a button, after which the listener may release the button to deactivate the request status after deciding he or she no longer wishes to talk. In this particular embodiment the THD device displays the indication (visually, audibly, or otherwise) either periodically or continually until the status of the continuous request changes to inactive.

Many different mechanisms involving the use of the TCRM may be used in accordance with this alternative embodiment, for example, in one embodiment the RHD device transmits a TCRM periodically to the THD device to maintain an active request status, and does not transmit the TCRM when an inactive status is desired. In this case, the THD device uses a time-out period longer than the periodicity of TCRM transmission in order to determine that the listener is indeed no longer requesting the talk/transmit channel. In accordance with alternative input mechanisms, a user could activate or deactivate the request status in any number of different ways, including but not limited to soft-keys, UI menu interface, and the existing PTT™ button. Other alternative ways of deactivating the request status include the RHD device sending a separate "cancel request message" to the THD device, or having the sending of any one TCRM toggle the request status, so that sending a second TCRM would suffice to deactivate the status.

In an alternative embodiment, a queue is utilized at the THD device to store information for multiple TCRMs received by the THD device in the order in which they arrived at the THD device. In this alternative embodiment, when a user deactivates a request status the user is removed from the ordered list of requesting users.

In some embodiments, during a single PTT™ talk session, the network forwards a preset number of TCRMs, the preset number being less than a preset threshold, and does not forward any more TCRMs until a new talk session is begun. In some embodiments the preset threshold is related to the capacity of a THD device to store and/or to display information of a maximum number of TCRMs. In alternate embodiments the threshold is set according to settings resident in the Network which may originate from an administrator or a carrier. In one embodiment, the preset threshold is one.

In some embodiments, the THD device is adapted to receive and display in real time every TCRM it receives regardless of its storage or display capacity, utilizing first in first out (FIFO) TCRM buffers, for rotating storage and/or display. In some embodiments the THD device is capable of displaying only one TCRM related message at any one time. In other embodiments, the THD device is capable of storing only one TCRM at any one time. In other embodiments the THD device is adapted to store a group of TCRMs, and adapted to display messages related to a subset of the group of TCRMs.

In some embodiments involving a queue, the THD device is adapted, such that once its FIFO buffers are filled to capacity, any additional TCRM received is simply ignored. In such an embodiment if an RHD device cancels a TCRM, the THD device is adapted to remove the relevant TCRM FIFO buffer entries so that the user display and data store may accept the next TCRM in the queue.

Figure 3:
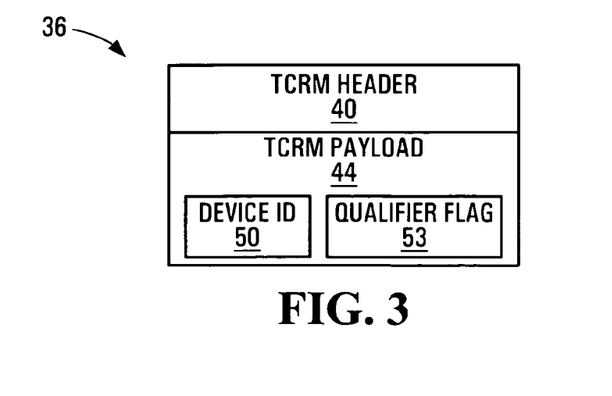
FIG. 3 is a block diagram of a transmit channel request message data structure in accordance with a further embodiment of the invention.

In other embodiments, the THD device is adapted to perform automated tasks in response to receiving the TCRM, for example by executing a stored algorithm. In such an embodiment, the system could be set up, for example, such that in response to receiving a TCRM 36 with a UFMI of a certain value, the THD device would cause the talk/transmit channel to be released automatically. In general, the use to which the TCRM is put by the THD device may be other than solely for the display of information with respect to a request for the talk/transmit channel.

In other embodiments, a receiving device which participates in calls of a PTT™ group may be automated to make important voice announcements to the group. In this embodiment, if the listening automated device needs to make an announcement during an active session, at step 110 it may send a TCRM message to the THD device whose user could respond to the request by releasing the talk/transmit channel so that the automated device may make the announcement to the group.

In yet another embodiment, the sending and processing of the TCRM may be automated or partially automated at both the RHD device and the THD device.

The TCRM and transmit channel request messaging method and system may be adapted for and used in any number of applications in a PTT™ or any other walkie-talkie-like or half-duplex voice communication system which would benefit from the capability of an RHD device to send to the THD device, a request for the transmit channel being held by the THD device. The reasons for sending the message and hence the functionality, if any, in response to the THD device's receipt of the TCRM will depend upon the use to which the transmit channel request messaging is put in the particular system in which it is implemented.

Referring to FIG. 3, an example TCRM data structure in accordance with a further embodiment of the invention will now be discussed. It is to be clearly understood this is but one example. Any appropriate message format can be employed. For example, in a POC implementation, a DTMF tone may be used to request the talk channel. This DTMF tone is interpreted by the network as a TCRM, and a message identifying the wireless device is sent to the THD device. It is also to be understood that in a most simple embodiment, the TCRM is simply the same message that would be generated when a user presses the "talk" button when the transmit channel is available. It is interpreted as a TCRM by the network if the transmit channel is occupied.

The example TCRM 36 is a datagram consisting of a header 40 and a payload 44. Depending upon the implementation of the system, the header 40 or the payload 44 could be indicative that the message is a request for the talk/transmit channel, and that it should be forwarded to the transmitting device of the active session. The identity of the device making the request would preferably form part of the payload 44 as a device ID 50. In the iDEN™ system the payload preferably includes the UFMI of the receiving device. This can be used to identify the receiving device which has sent the request. In some embodiments, the payload includes a TCRM qualifier flag 53 which is used for extended functionality. In such an embodiment TCRM handling is further customized by the DAP or THD device performing different functionality. The TCRM qualifier flag 53 contains information which may be indicative of, but not limited to the following: a state of the RHD device, the nature of the call, or the nature of the TCRM. In a specific preferred embodiment, the qualifier flag 53 may exhibit one of four machine readable values which indicate the following: Flag value 1—RHD device making talk channel request; Flag value 2—RHD device making a continuous talk channel request; Flag value 3—RHD device terminating/canceling previous request; Flag value 4—RHD device making high priority request for talk channel.

In some embodiments, Flag value 1 is a default value for non-extended functionality of the TCRM. In such a case the THD device treats the TCRM the same way as it would treat a TCRM with no qualifier flag 53. In other embodiments Flag value 2 is a value to indicate that until the THD device receives a subsequent terminating or canceling request from the RHD device, the current transmit channel request of the TCRM containing the qualifier flag 53 stands. Flag value 3 is used to instruct the THD device that a previous request is cancelled, and therefore that the RHD device is no longer requesting the transmit channel. Flag value 4 enables the THD device to override the talker's choice to continue to occupy the transmit channel, the result of which is the automatic release by the THD device and hence the network, of the transmit channel. In a preferred embodiment not all devices have Flag value 4 as one of its TCRM qualifiers, in such a system classes of services are provided to differentiate between devices which can and cannot send TCRMs with Flag value 4 in the payload. In some embodiments, classes of services are registered on a DAP and managed thereby. In an embodiment capable of using Flag value 4, a mediator or administrator of a group, having a device capable of sending Flag value 4 in its TCRM would be able to interrupt the talker and possess the transmit channel.

It should be understood that the particular structures and values of the qualifier flag 53 will depend upon the particular context in which the TCRM is used. The discussion above regarding four specific flags, and the four specific resulting kinds of functionality performed in response thereto, should be understood to constitute a discussion of an example only of the possible numbers, structures, and values of qualifier flags and possible types of functionality associated therewith.

Referring again to the TCRM header 40, the header includes standard routing protocol and other headers required to transmit the message appropriately to the network, which ensures that that it is forwarded to the proper THD device of the active session in which the RHD device is participating. In some embodiments adapted to the iDEN™ standard, the header 40 includes standard dispatch call control headers such as a protocol discriminator header, a transaction identifier header, and a transaction identifier flag header. In some embodiments another header "message type" is set to a value which is representative of the type of message being a TCRM. This may be the same value for incoming and outgoing TCRMs or may be set differently to distinguish between incoming and outgoing TCRMs. In some embodiments, the TCRM has a different structure when it is inbound from when it is outbound.

In some embodiments the header of an incoming TCRM does not include a target UFMI of the THD device since the RHD device may not be aware of this. The network is capable of determining the THD device of the talk group in which the RHD device is participating. In some embodiments the header of an outgoing TCRM includes a target UFMI or other identification of the THD device in order for the network to forward it to the THD device. In some embodiments an outbound TCRM and an inbound TCRM have the same structure. In such embodiments, the inbound TCRM does not have an identification of the target THD device in the dispatch call control header. Space may be reserved in the TCRM for the dispatch call control header as it would be used in an outgoing TCRM. Depending upon the particular use to which the TCRM is put, and the particular system in which it is implemented, the structure of the TCRM datagram may change. The TCRM in a particular context preferably is such that it is sufficient when received by the THD device to notify the THD device that the talk/transmit channel is requested.

In some embodiments, the TCRM is simply broadcast. The THD device, being the only device in THD mode, will recognize the message as being for itself. In other embodiments, the TCRM is broadcast and contains an identifier of the THD device. In other embodiments the TCRM is sent on a device specific channel to the THD device in which case the identifier of the THD device might be required.

Figure 4:
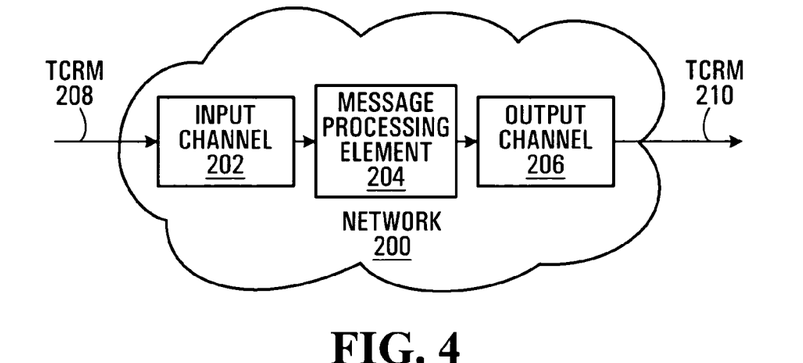
FIG. 4 is a conceptual block diagram of a network provided by an embodiment of the invention.

Referring now to FIG. 4, shown is a very schematic diagram of a network adapted to provide the TCRM functionality. The network is generally indicated at 200. This functionality might for example include the functionality represented by links 25 and network 39 of FIG. 1. The network provides wireless half duplex communications to accessing devices which may be wireless. The network 200 is shown having input channel 202 through which it is capable of receiving wirelessly the TCRM 208. This input channel can be any appropriate channel over which communications between a listening device and the network can take place. This might initially take place for example in a base station. Also shown within the network 200 is a message processing element 204. This element processes the incoming TCRM message 208, and determines where the message should be forwarded, namely to the device in the same talk group as the device that generated the TCRM 208 that is currently in the transmitting or talking mode. The message processing element 204 can be implemented in a single location within the network 200 or in a distributed manner. In a preferred embodiment, this is implemented within a call processing controller such as a DAP. The network 200 also has an output channel 206 through which is transmitted the TCRM 210 towards the device which is in talking mode. In a typical instance, the input channel 202, the message processing element 204 and the output channel 206 would be in different components within the network 200. However, this is not essential. One or more of these elements/functionalities might be included within a single network element within the network 200.

Although the example embodiments illustrated herein describe transmit channel request messaging and a TCRM which is specifically tailored to PTT™ over the dispatch service of the iDEN™ system, in general the invention should be understood as not being limited thereto and therefor applicable to other systems which support but are not limited to, half-duplex voice communication, such as 1xRTT CDMA, UMTS, GSM/GPRS, and TDMA.

Figure 5:
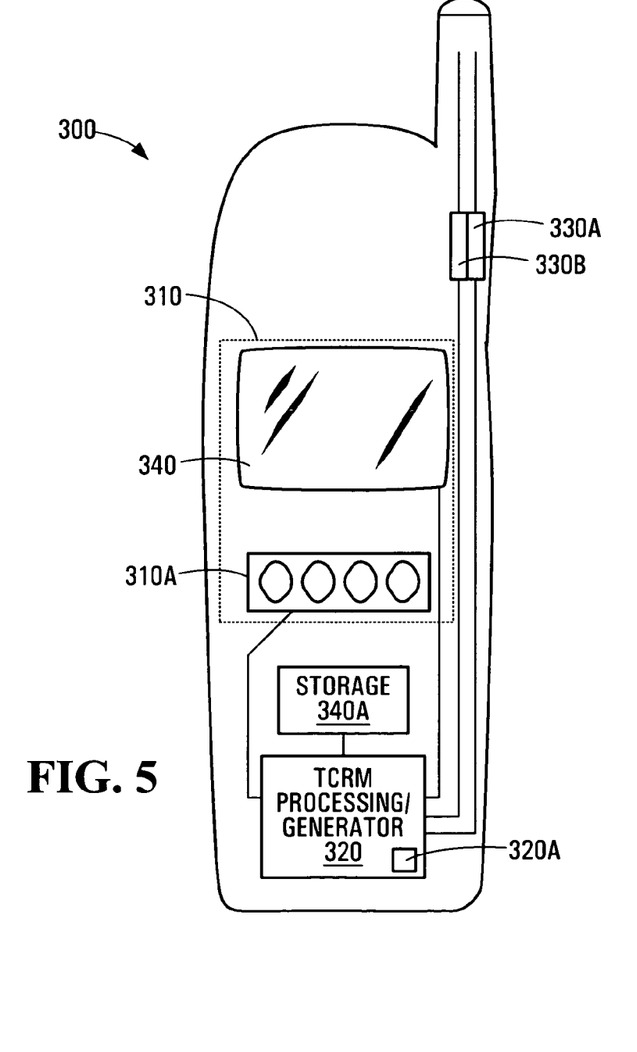
FIG. 5 is a block diagram of an example implementation of a PTT™ capable wireless device provided by an embodiment of the invention.

Referring to FIG. 5, an example implementation of a PTT capable wireless device 300 provided by an embodiment of the invention, will now be discussed.

Wireless device 300 is a wireless device modified by the implementation of functional elements provided in accordance with an embodiment of the invention.

In the embodiment depicted in FIG. 5, an input mechanism/request receiver 310 includes a keypad 310*a*, and a touchscreen 340. Other embodiments could include any other suitable local input element and in some embodiments the wireless device 300 has a display screen instead of a touchscreen 340. The input mechanism/request receiver 310 is coupled to a TCRM processing/generator 320. The TCRM processing/generator 320 includes extended processing functions 320*a* which includes features such as filtering and flood protection. These functions are not necessarily present in other embodiments. The TCRM processing/generator 320 is coupled to message transmission element 330*a*. The message transmission element 330*a* may share resources with a message reception element 330*b*. The message reception element 330*b* is coupled to the TCRM processing/generator 320. A storage element 340*a* and a display element in the form of a touchscreen 340 are each coupled to the TCRM processing/generator 320.

With respect to function, the wireless device 300 depicted in FIG. 5 is able to operate in THD mode and RHD mode.

While in RHD mode, the wireless device is able to receive input from the input mechanism/request receiver 310 by way of the keypad 310*a* and/or the touchscreen 340. These are provided to the listener to initiate the sending of a TCRM to a THD device while the wireless device 300 is in RHD mode. Once the request is input, the TCRM processing/generator 320 generates a TCRM including the identification of the wireless device 300 and forwards it through the message transmission element 330*a* over a logical control channel to a network (not shown).

While in TDH mode, the wireless device is able to receive a TCRM from the network over the message reception element 330*b*. The TCRM is input to the TCRM processing/generator 320, where it is processed for any required extra functionality, and a copy of which is saved in storage element 340*a*. Any necessary conversion of the information in the TCRM into human readable form is executed and the resulting indication displayed on the touchscreen 340.

In other embodiments, the TCRM processing/generator 320, storage 340*a* and input mechanism/request receiver 310 cooperate to provide functionality associated with other embodiments described herein above. A specific example of a PTT™ wireless device has been given. More generally, embodiments of the invention are applicable to any wireless devices capable of participating in network provided walkie-talkie-like communication, which is further equipped with the capacity to send and receive and process TCRMs in a form suitable for a given implementation.

In other embodiments, the method, system, and device are adapted to provide peripheral support for wired devices to participate in a wireless call via a network interworking function, so that although the devices are not within the wireless network, they appear as though they are, and are able to participate therein. Hence, according to this embodiment, not all of the devices in a PTT™ group are wireless, and transmit channel request messaging occurs in an analogous manner to that described hereinabove in PTT™ groups where one or more of the devices is a stationary or otherwise non-mobile wired device. Hence, a wireless PTT™ session may have wired or landline based devices participating in the PTT™ session in accordance with the embodiments, adapted to transmit and receive messages for transmit channel request messaging.

Numerous modifications and variations of the present invention are possible in light of the above teachings. It is therefore to be understood that within the scope of the appended claims, the invention may be practised otherwise than as specifically described herein.

We claim:

1. A method of messaging during an active half-duplex session between a plurality of user devices capable of half-duplex voice functionality, the method comprising:
    a first user device of said plurality of user devices while in a receiving in half-duplex (RHD) mode for an active half-duplex session, transmitting a transmit channel request message (TCRM) to a network, the TCRM indicating a request from the first user device to transmit on the transmit channel;
    the network forwarding the TCRM to a second user device of said plurality of user devices while the second user device is in a transmitting in half-duplex (THD) mode for the active half-duplex session;
    the TCRM including an identification of the first user device;
    the TCRM including a qualifier flag at least when the TCRM is forwarded to the second user device;
    the second user device receiving the TCRM; and
    the second user device performing extended functionality in response to a value of the qualifier flag,
    wherein the extended functionality comprises at least one functionality selected from the group consisting of:
    a) registering a continuing transmit channel request at the THD device;
    b) canceling a transmit channel request at the THD device; and
    c) performing automatic release of the transmit channel by the THD device.

2. A method according to claim 1 wherein each user device of the plurality of user devices is a wireless device.

3. A method according to claim 2 further comprising the first user device locally receiving a request to transmit the TCRM.

4. A method according to claim 2 wherein the half-duplex session is a voice communication session compliant with at least one system selected from the group of iDEN™, 1XRTT CDMA, GSM/GPRS, UMTS, and TDMA.

5. A method according to claim 2 further comprising:
    the second user device in response to receiving the TCRM generating a user-detectable notification indicating the second user device has received the TCRM.

6. A method according to claim 2 further comprising:
    the network, upon receiving the TCRM from the first user device, determining a talk group the first user device is participating in, determining another user device in the talk group that is in THD mode, which another user device is said second user device.

7. A method according to claim 1 further comprising:
    the second user device generating user-detectable notification indicative of the identification of the first user device.

8. A user device capable of half-duplex voice functionality adapted to participate in an active half-duplex session, the user device comprising:
    means for receiving an external input requesting the user device to transmit an outgoing TCRM message, the TCRM indicating a request from the user device to transmit on the transmit channel;
    means for transmitting the outgoing TCRM to a wireless network responsive to the request;
    means for receiving an incoming TCRM message from the wireless network while the user device is in transmit half-duplex mode, wherein the incoming TCRM comprises a qualifier flag, and wherein the user device is adapted to perform extended functionality in response to a value of the qualifier flag of the TCRM; and
    means for generating a user-detectable notification in response to receiving the incoming TCRM message wherein the received TCRM comprises an identification of another user device which originally sent the received TCRM and wherein the notification comprises the identification,
    wherein the extended functionality performed in response to a value of the qualifier flag of the TCRM comprises at least one functionality selected from the group consisting of:
    a) registering a continuing transmit channel request at the THD device;
    b) canceling a transmit channel request at the THD device; and
    c) performing automatic release of the transmit channel by the THD device.

9. A user device according to claim 8 wherein the user device is a wireless device.

10. A user device according to claim 9 wherein the active half-duplex session is a Push-to-Talk™ half-duplex voice communication session.

11. A user device according to claim 9 wherein the outgoing TCRM comprises an identification of the user device.

12. A user device according to claim 9 wherein the outgoing TCRM comprises a qualifier flag, and wherein the value of the qualifier flag of the TCRM is indicative of a request for the performance of extended functionality.

13. A user device according to claim 12 wherein the request for the performance of extended functionality indicated by the TCRM comprises at least one functionality selected from the group consisting of:
    a) registering a continuing transmit channel request at the THD device;
    b) canceling a previously received transmit channel request at the THD device; and
    c) performing automatic release of the transmit channel by the THD device.

14. A system comprising at least one user device according to claim 9 in combination with:
    a network adapted to facilitate an active half-duplex session, the network comprising:
    a message forwarding element for forwarding a TCRM received from an RHD device capable of half-duplex voice functionality to a THD device capable of half-duplex voice functionality.

15. A system comprising at least one device according to claim 9 in combination with:
- a network adapted to facilitate an active half-duplex session, the network comprising:
- a message forwarding element for forwarding a TCRM received from an RHD device capable of half-duplex voice functionality to a THD device capable of half-duplex voice functionality.

16. A network adapted to facilitate an active half-duplex session involving an RHD device capable of half-duplex voice functionality and a THD device capable of half-duplex voice functionality, the network comprising:
- a message processing element adapted to forward a TCRM from the RHD device to the THD device by:
  i) receiving the TCRM over an input channel from the RHD device, the TCRM indicating a request from the RHD device to transmit on the transmit channel;
  ii) processing the TCRM to identify from the TCRM the identity of the THD device;
  iii) transmitting the TCRM over an output channel to the THD device;
  iv) including an identification of the RHD device in the TCRM; and
  v) including a qualifier flag in the TCRM at least when the TCRM is transmitted to the THD device to instruct the THD device to perform extended functionality in response to a valve of the qualifier flag,
  wherein the extended functionality performed in response to a value of the qualifier flag of the TCRM comprises at least one functionality selected from the group consisting of:
    a) registering a continuing transmit channel request at the THD device;
    b) canceling a transmit channel request at the THD device; and
    c) performing automatic release of the transmit channel by the THD device.

17. A memory for storing data for access by a THD device of a network, comprising:
- a data structure stored in said memory, said data structure being a TCRM and comprising an identification of an RHD device, the TCRM indicating that the RHD device has requested to transmit on the transmit channel, and the TCRM including a qualifier flag to instruct the THD device to perform extended functionality in response to a valve of the qualifier flag of the TCRM,
  wherein the extended functionality performed in response to a value of the qualifier flag of the TCRM comprises at least one functionality selected from the group consisting of:
    a) registering a continuing transmit channel request at the THD device;
    b) canceling a transmit channel request at the THD device; and
    c) performing automatic release of the transmit channel by the THD device.

* * * * *